Oct. 2, 1951            G. DE BOTHEZAT          2,569,882
CONTROL AND SUPPORT CONNECTION
FOR HELICOPTER ROTOR SYSTEMS
Filed June 29, 1946                          9 Sheets—Sheet 1
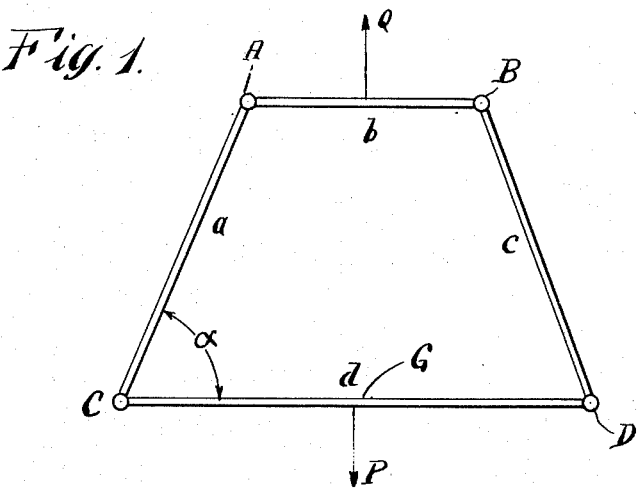
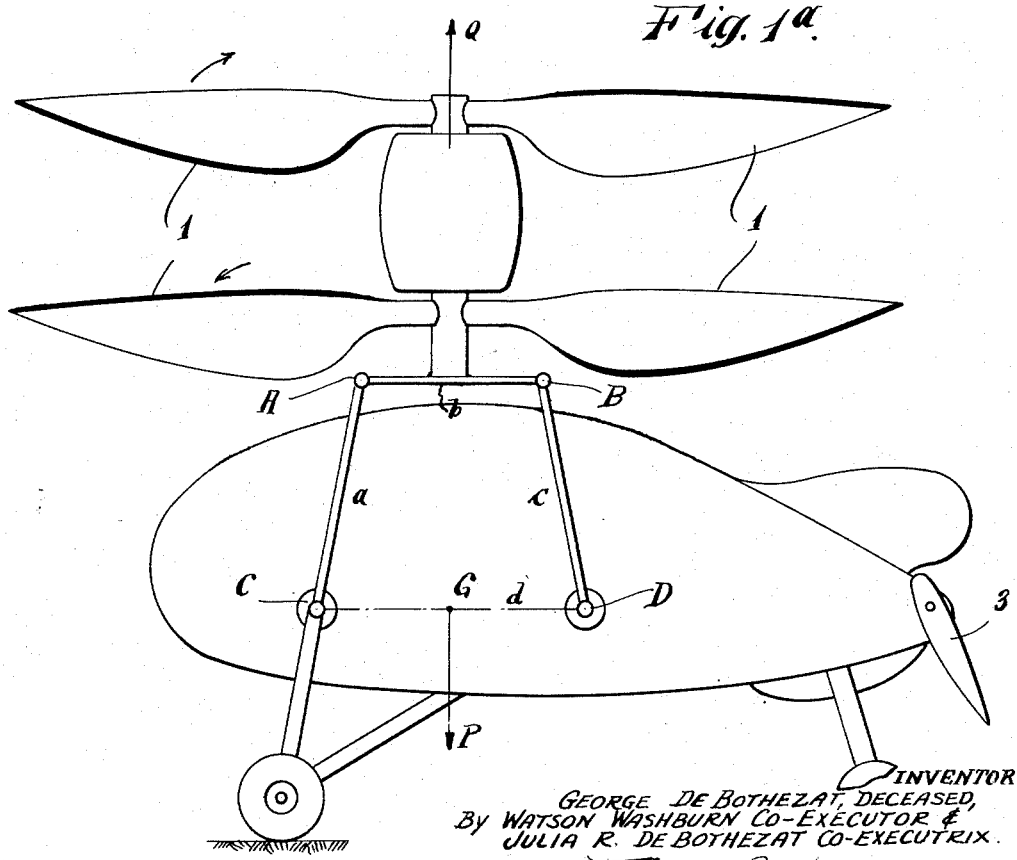
INVENTOR
GEORGE DE BOTHEZAT, DECEASED,
By WATSON WASHBURN CO-EXECUTOR &
JULIA R. DE BOTHEZAT CO-EXECUTRIX.
BY Frank A. Bower ATTORNEY Oct. 2, 1951     G. DE BOTHEZAT     2,569,882
CONTROL AND SUPPORT CONNECTION
FOR HELICOPTER ROTOR SYSTEMS
Filed June 29, 1946     9 Sheets-Sheet 2

INVENTOR
GEORGE DE BOTHEZAT, DECEASED,
BY WATSON WASHBURN CO-EXECUTOR &
JULIA R. DE BOTHEZAT CO-EXECUTRIX

BY Frank A. Bower, ATTORNEY

Oct. 2, 1951 G. DE BOTHEZAT 2,569,882
CONTROL AND SUPPORT CONNECTION
FOR HELICOPTER ROTOR SYSTEMS
Filed June 29, 1946 9 Sheets-Sheet 3

INVENTOR.
GEORGE DE BOTHEZAT, DECEASED,
BY WATSON WASHBURN CO-EXECUTOR &
JULIA R. DE BOTHEZAT CO-EXECUTRIX
BY Frank A. Bower ATTORNEY

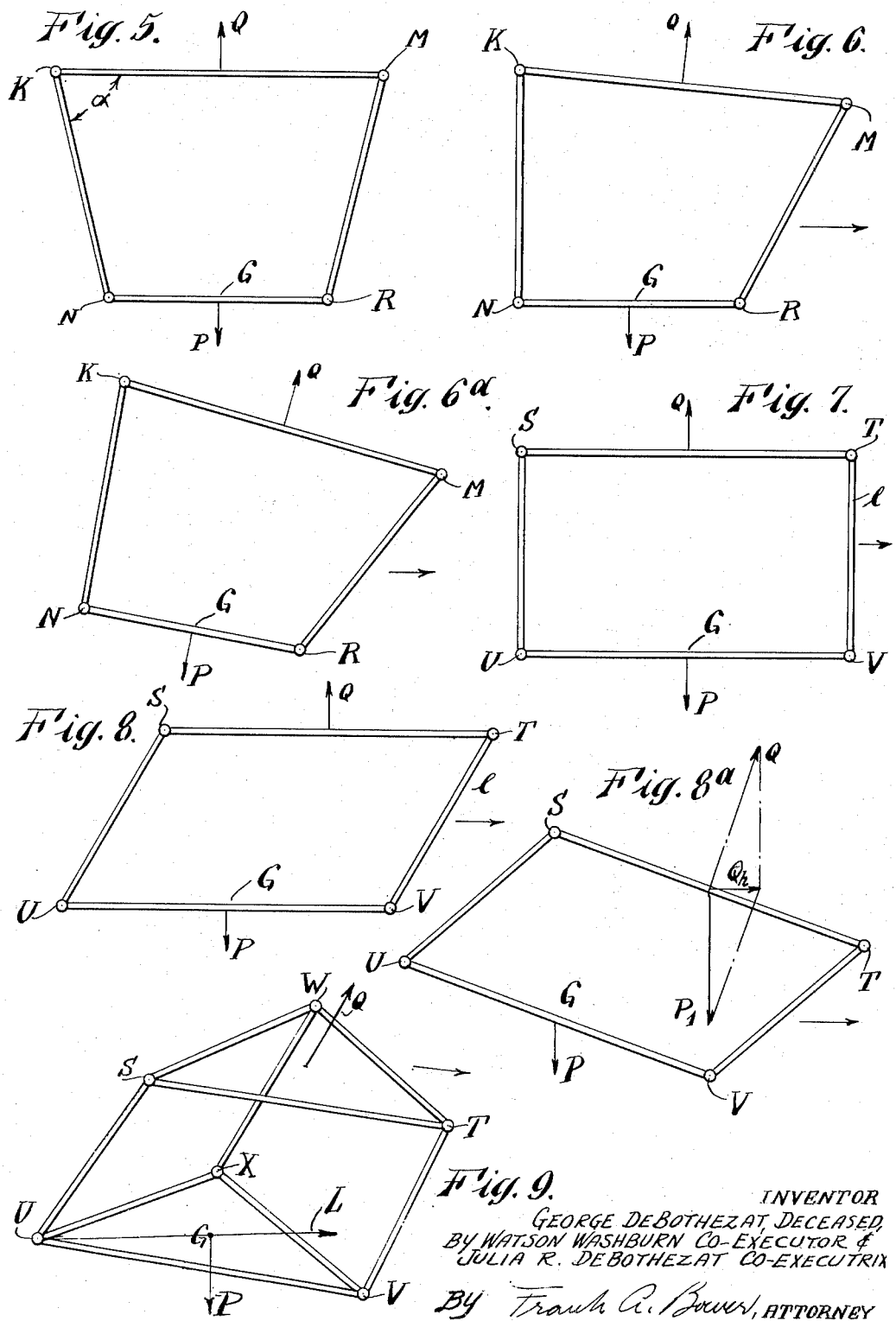

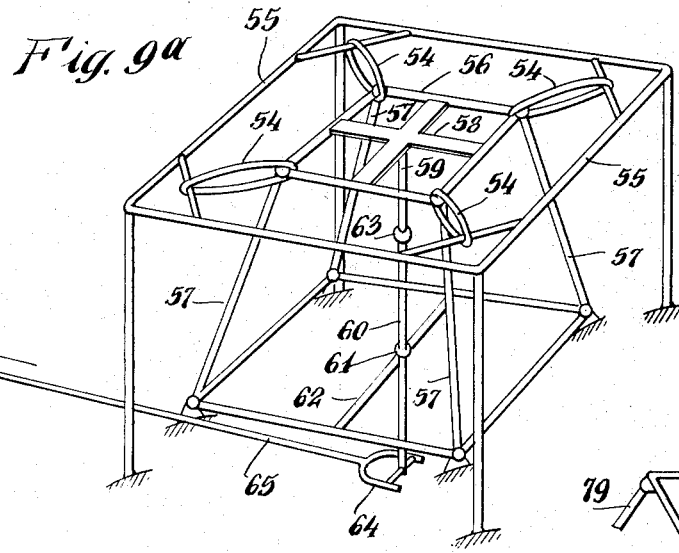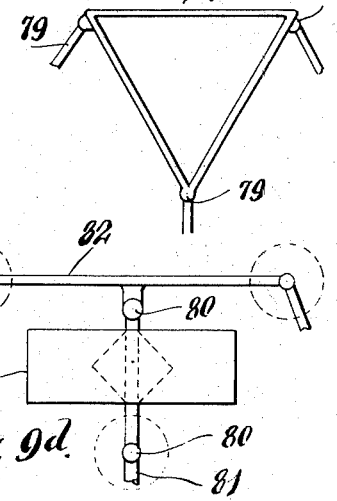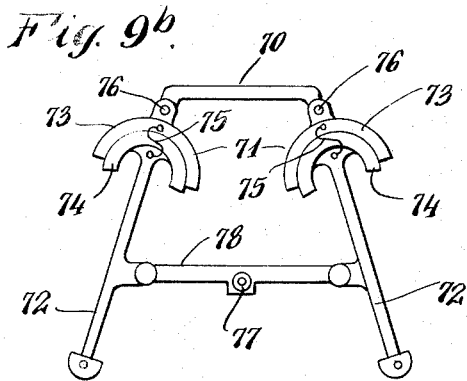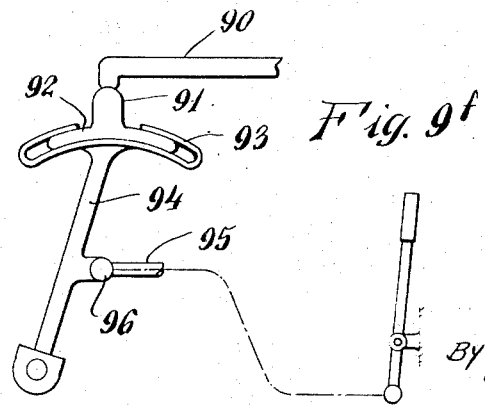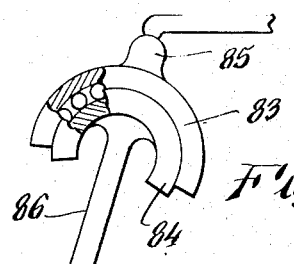

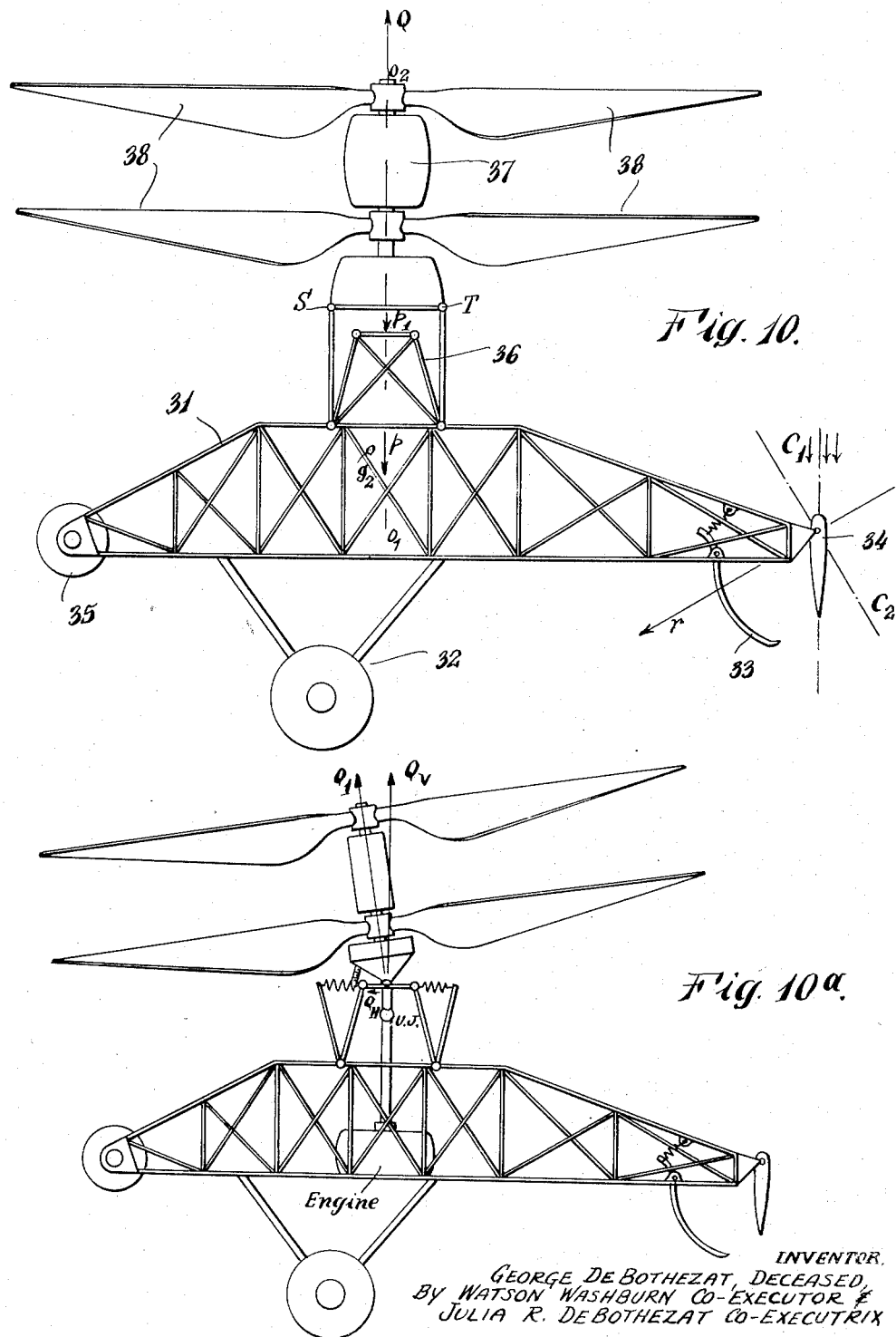

Oct. 2, 1951     G. DE BOTHEZAT     2,569,882
CONTROL AND SUPPORT CONNECTION
FOR HELICOPTER ROTOR SYSTEMS
Filed June 29, 1946                9 Sheets-Sheet 7
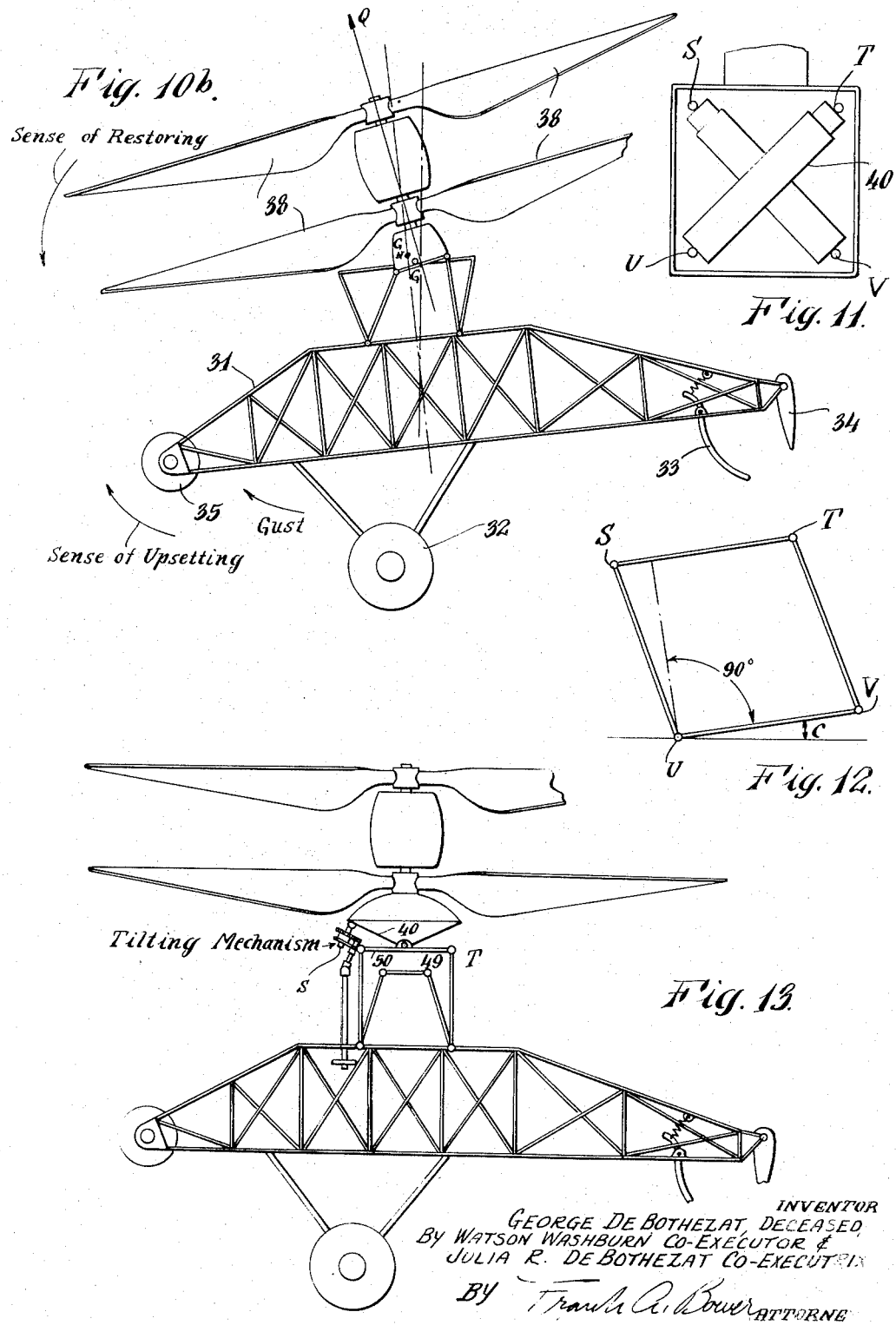
INVENTOR
GEORGE DE BOTHEZAT, DECEASED,
BY WATSON WASHBURN CO-EXECUTOR &
JULIA R. DE BOTHEZAT CO-EXECUTRIX
BY Frank A. Bower ATTORNEY

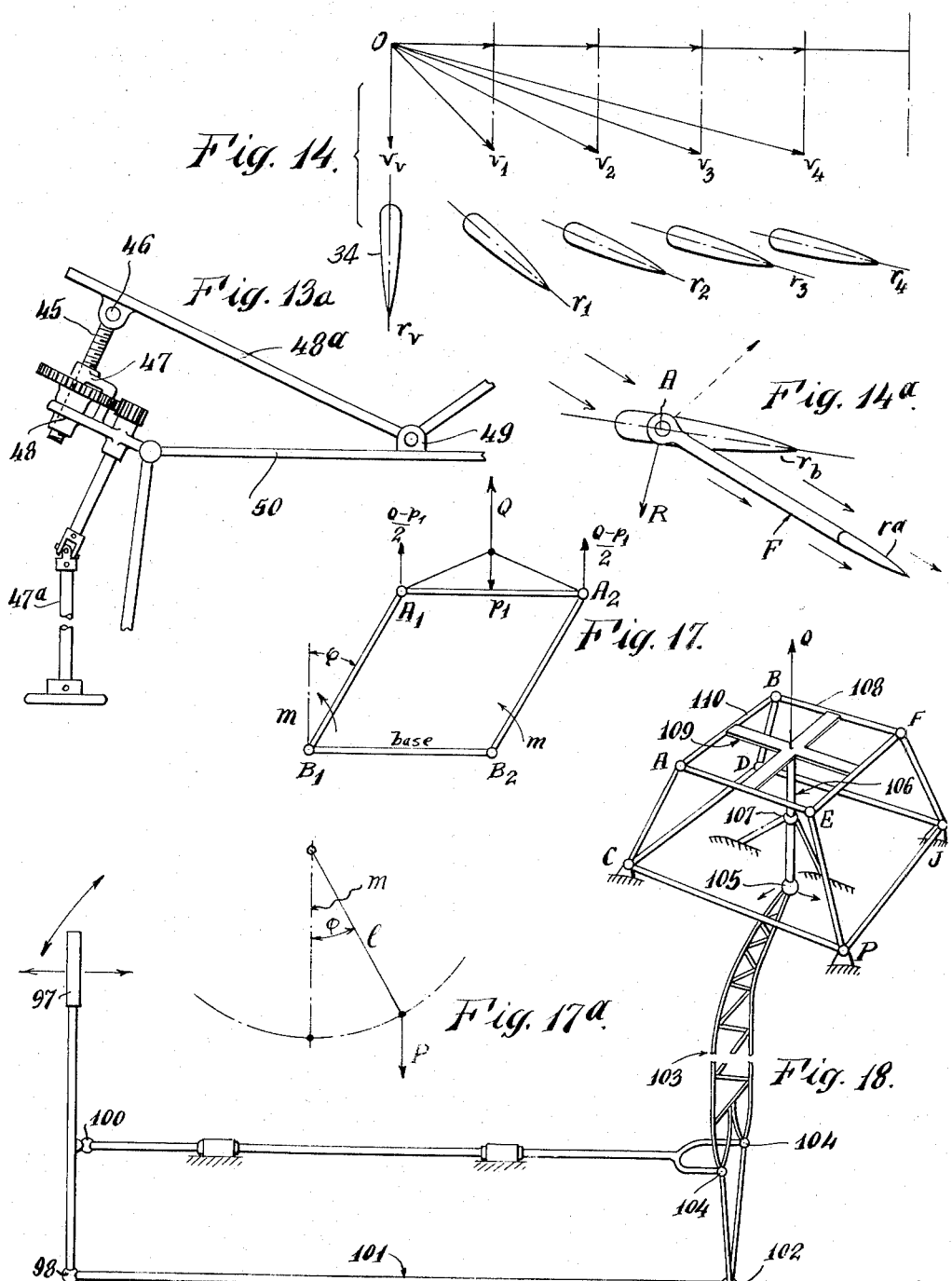

Oct. 2, 1951  G. DE BOTHEZAT  2,569,882
CONTROL AND SUPPORT CONNECTION
FOR HELICOPTER ROTOR SYSTEMS
Filed June 29, 1946  9 Sheets-Sheet 9
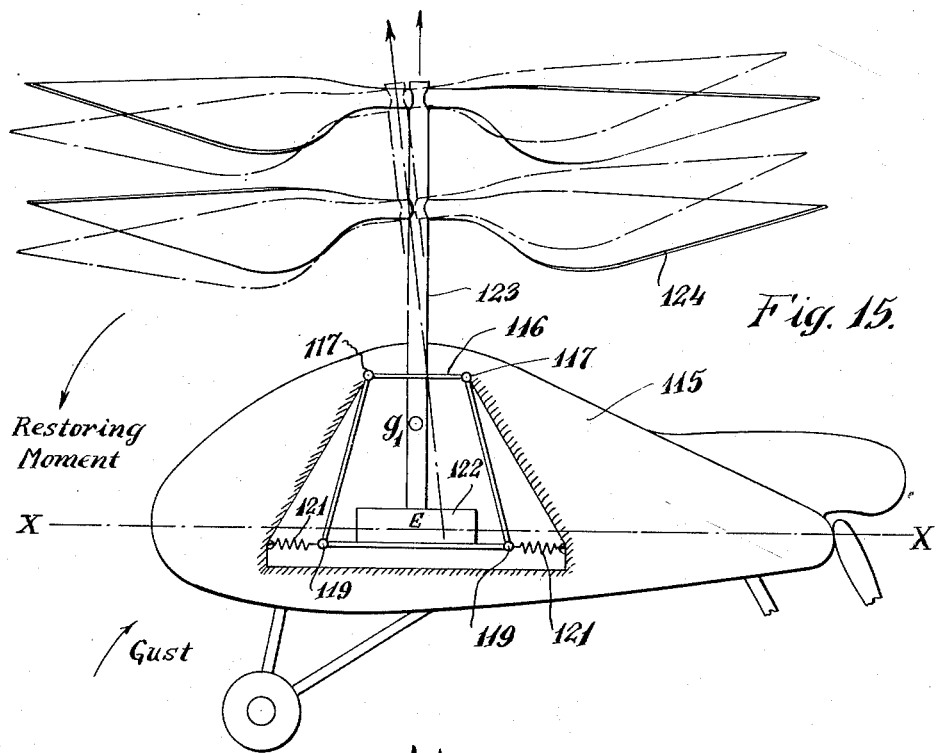
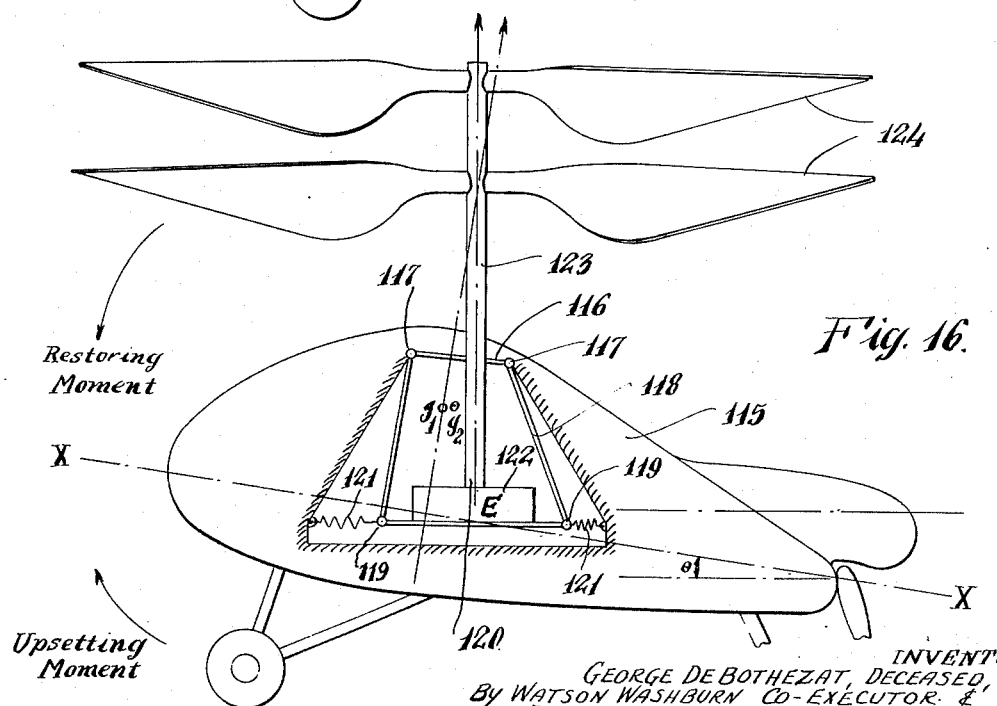
INVENTOR
GEORGE DE BOTHEZAT, DECEASED,
By WATSON WASHBURN Co-EXECUTOR &
JULIA R. DE BOTHEZAT Co EXECUTRIX
BY Frank A. Bower
ATTORNEY Patented Oct. 2, 1951

2,569,882

UNITED STATES PATENT OFFICE 2,569,882

CONTROL AND SUPPORT CONNECTION FOR HELICOPTER ROTOR SYSTEMS

George de Bothezat, deceased, late of New York, N. Y., by Watson Washburn, coexecutor, New York, N. Y., and Julia R. de Bothezat, coexecutrix, Larchmont, N. Y., assignors to Helicopter Corporation of America, Flushing, N. Y., a corporation of New York Application June 29, 1946, Serial No. 680,384

17 Claims. (Cl. 244—17.25)

This invention relates to heavier than air flying machines of airplane or helicopter type and including multi-axis types, and particularly to the positive insuring of complete inherent stability of such machines.

The object of the invention is to provide stability to a flying machine, and particularly to helicopters in which the lifting system is connected to its load, the lifted system, by a link suspension which will have a constant tendency automatically to maintain a predetermined stable relative positioning of the lifting system and the lifted system.

A further object of the invention is to provide a flying machine, particularly of the helicopter type equipped with lifting air screws, the blades of which have two freedoms of suspension at their hubs, with inherent stability of the aircraft system as a whole.

Further objects of the invention, particularly in providing a stabilizing suspension in the form of articulated quadrilateral linkages between a lifting system and the lifted system of a helicopter, will appear from the following specification taken in connection with the accompanying drawings in which Fig. 1 is a diagram illustrating a typical relation between the lifting system and the lifted system with the suspending linkages between them;

Fig. 1a is an outline of a system similar to that shown in Fig. 1 applied to a helicopter;

Fig. 5 is a diagram illustrating a diverging system of suspension;

Figs. 6 and 6a are similar diagrams illustrating adjusted positions of the system of Fig. 5;

Fig. 7 is a diagram illustrating a parallel system of suspension;

Figs. 8 and 8a are diagrams illustrating the action of the parallel suspension;

Fig. 9 is a diagrammatic view in perspective of a parallel suspension as applied between the lifting and lifted system with a triangular base;

Fig. 9a is a diagrammatic perspective showing a modified polygonal suspension;

Figs. 9c to 9f are diagrams of details of the suspending means;

Fig. 10 is a diagram illustrating in more detail the application of the parallel suspension system to a helicopter;

Figs. 10a and 10b are views similar to Fig. 10 but illustrating modified forms of suspension;

Figs. 11 and 12 are diagrammatic views illustrating the action of a parallel suspension;

Figs. 13 and 13a are views similar to Fig. 10 illustrating an adjusting mechanism applied between the lifting unit and the top unit of the articulated suspension;

Fig. 14 is a diagrammatic view illustrating the relative velocity of the slip stream due to forward motion;

Fig. 14a is a diagrammatic view illustrating the action of the air stream on a control vane;

Figs. 15 and 16 are outlines of inverted diverging suspensions;

Figs. 17 and 17a are diagrams illustrating the action of the parallel articulated suspension; and Fig. 18 is a diagrammatic view of connections between an articulated suspension and the pilot control.

In the diagrams of Figs. 1 and 1a, the line A, B represents the base of a lifting unit of a helicopter provided with rotary blades applying a lifting force Q at a 90° angle to line A, B. The load or lifted unit (fuselage, etc.) has a center of gravity, for instance as G, applying a vertically downward force P and connected to the base CD by articulation. The articulations A, B, C and D are universal joints so that the load line CD swings pivotally suspended from the lifting unit A, B by links $a$, $c$.

Assuming that the lifting airscrews are speeded up, under the conditions diagrammed in Figs. 1 and 1a, until the lifting force Q is greater than the weight of the total machine, the helicopter will then rise vertically, all parts and conditions being balanced around the vertical line of lift Q. If in this suspended condition a force is exerted tending, for instance, to move the top line A, B to the right relative to the base CD, the linkages will shift toward the shape shown in Fig. 2 where for convenience in comparison the base CD is maintained horizontal. The result is a moment set up of Q around G tending to incline the polygon A, B, C, D counter-clockwise. Since this is the direction in which the tipping of line A, B tends toward (Fig. 2), the tipping of the lift Q toward the left is accompanied by a tendency of the load to tip lift Q in the same direction.

There will thus be developed a leftward component of the lift Q carrying the helicopter in this direction so long as the shift of line A, B is maintained. During this flight there is a continuous tendency of the linkages A, B, C, D, to return to a condition of less inclination and the shift of the linkages must be maintained to continue the same forward component of the lift Q.

Figure 2:
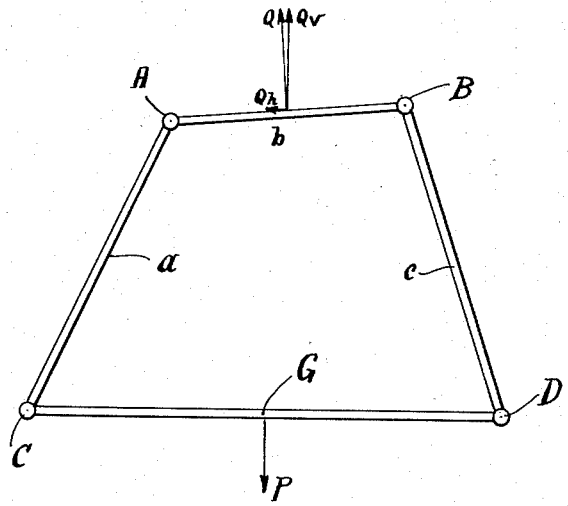
Figs. 2 and 2a are diagrammatic views similar to Fig. 1 illustrating different positions of the system of Fig. 1.
Figure 2A:
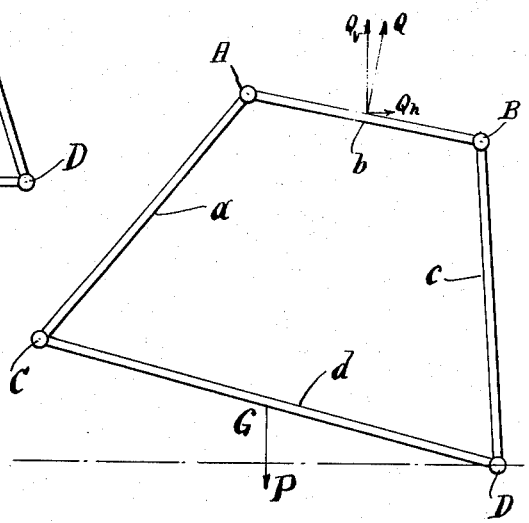

As shown in Fig. 2a, a shift of line A, B to the left relative to line C, D tends to tip the system clockwise to give flight to the right.

This suspension thus automatically develops the horizontal component for flight of the helicopter in accordance with the shift of the linkages and tends always to restore the linkages against the shifting effort.

This restoring or stabilizing effort is inherent in the suspension and is effective whenever the normal set of the linkages is disturbed in any manner by the pilot control or by air currents. The load always hangs pendulum-like from the lifting unit and the suspension is moved to different adjustments by the pilot in accordance with the desired component of horizontal movement. From the point of view of the pilot with this converging suspension when he shifts his control stick forward to shift himself and lifted system C, D to the left (forward, for instance) relative to the lifting system A, B, the helicopter will move in the direction of the relative movement of his stick and the lifted system.

Figure 3:
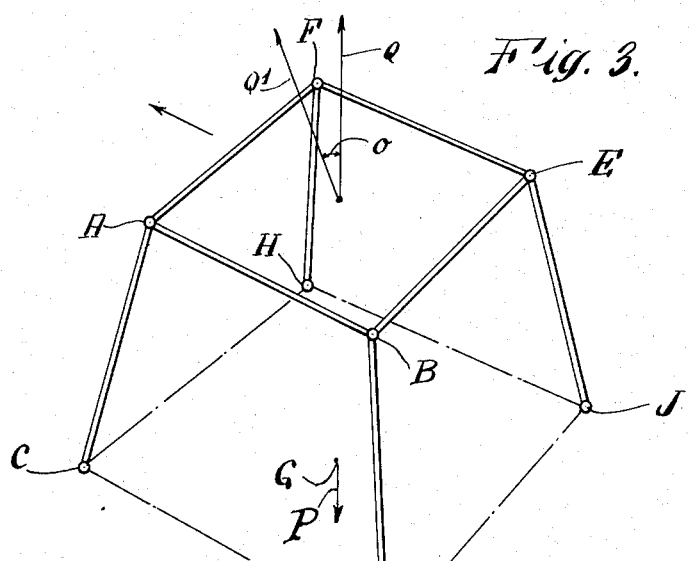
Fig. 3 is a diagram illustrating in perspective the application of a converging articulated suspension system.
Figure 4:
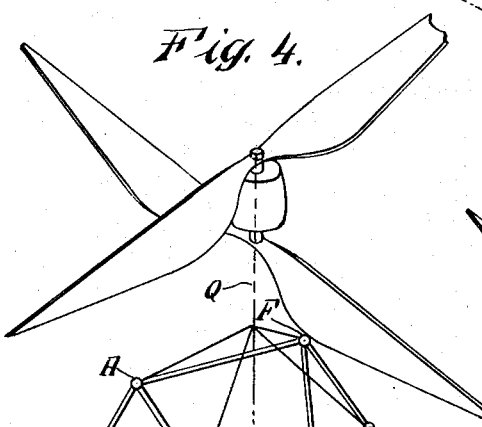
Fig. 4 is a diagram similar to Fig. 3 illustrating an adjusted position of the system.
Figure 4A:
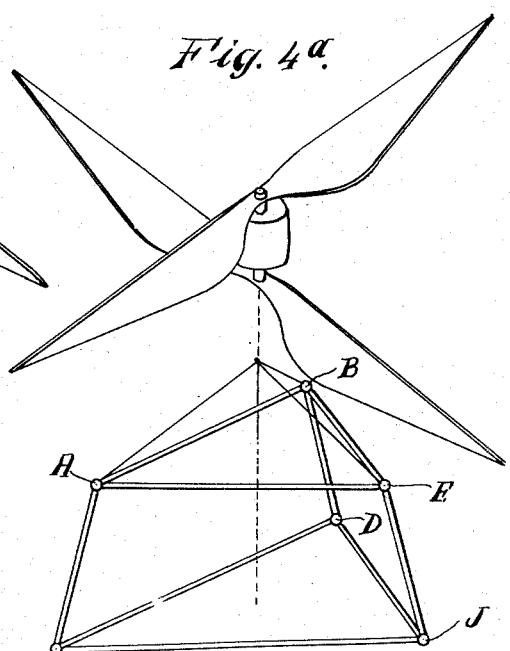
Fig. 4a is a diagram showing a modified suspension system with triangular base.

The structure and action of this articulated polygonal suspension may be varied as hereinafter indicated, and may be combined longitudinally and transversely to give both forward and sidewise stability and control of the helicopter flight. For instance, as shown in Figs. 3, 4 and 4a, the side polygons A, B, C, D and E, F, J, H may be combined with the front and rear polygons F, A, H, C and B, E, D, J, all of the articulations A, B, C, D, E, F, H and J being universal. The lifting unit having base A, B, E, F exerts an upward force Q, and the center of gravity of the load (fuselage, landing gear, etc.) carried by the pivots C, D, J, H is preferably below the plane of these pivots and substantially vertically below the upward thrust Q.

With this articulated polygonal suspension system relative adjustment of lifting unit A, B, E, F rearward (Fig. 3) will develop a forward flight component as above explained. Similarly, forward adjustment of the lifting unit produces a backward flight component and either sidewise shift of the lifting unit results in a correspondingly opposite sidewise flight component. The longitudinal and transverse adjustments may be made at the same time to give flight in any direction around the entire compass, the rate of flight being regulated by the amount of the relative shift of the lifting unit. As outlined in Fig. 4a, the lifting unit A, B, E and base C, D, J may be triangular.

In all of these controls the suspension system exerts a constant restoring force tending to return the parts to normal neutral position which has been taken as a vertical coincidence of the lifting force Q and gravity pull G. The initial setting of the lifting force may be varied, for instance, by inclining the angle of the lift Q relative to the top unit A, B, E, F as indicated at Q' (Fig. 3) where the line of the lifting effort is tipped forward through angle Q. This sets a forward inclination of the lift to which the suspension will automaticaly seek to adjust itself by shifting to tip the load counter-clockwise (Fig. 3) as it is lifted from the ground, the top unit A, B, E, F moving to the left and tipping clockwise to reduce the inclination of thrust Q relative to the vertical and bring the thrust line nearer in line with the gravity center G of the load.

Figure 2B:
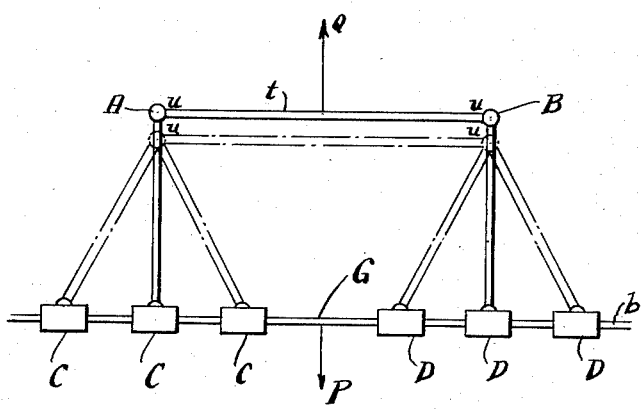
Fig. 2b is a diagram illustrating the effect and adjustment of the point of articulation.

A change in the relation of Q and P may also be attained by a shift of the center of gravity G or of pivot A or B (Fig. 1) relative to Q or of pivot C or D relative to P. For instance, moving pivot C by a sliding mechanism (Fig. 2b) toward P would relatively move the center of gravity G and downward-total-pull P (forward tending to tip the whole system counter-clockwise.

The articulated polygonal suspension instead of converging upward might diverge upward as illustrated in Figs. 5, 6 and 6a where the lifting link K, M is longer than the load link N, R. In such case a relative shift of the lifting unit will produce a propulsive component in the same direction as the shift, as illustrated.

As a special case of the suspension system of this invention, the linkages may be joined as parallelograms so that the vertical links SU, TV and the horizontal links ST, UV are always parallel as illustrated in Figs. 7, 8 and 8a. The propulsive component of the lift may be developed either by inclination of the helicopter as a whole by shift of the center of gravity forward in the direction of flight to correspondingly incline the angle of the lift Q, or by tilting mechanism. With such parallel suspension, the angle of lift Q may be initially adjusted and set to have a forward component relative to the link ST (Fig. 13).

In all of these systems, the universally articulated polygons may be combined by transverse and longitudinal linkages as illustrated for the converging linkages of Figs. 1, 2 and 3. The combined system instead of being rectangular in horizontal section may be otherwise shaped, for instance as a triangle, as illustrated in Fig. 9 at STW and UVX for the parallel suspension of Figs. 7 and 8. The lengthwise line of the helicopter is indicated by L with the linkages tipped clockwise from normal vertical to direct the flight to the right. The propulsive component may be in any direction as determined, for instance, by the inclination of parallel links SU, TV (Fig. 8a).

In any system the inclination of the upright linkages and the relative shifting of the lifting unit is under the control of the pilot to give the desired forward and transverse movements of the helicopter. The constant effort of the suspension is to return the parts to the initial relative positioning with the center of gravity G substantially vertically below the lift Q. It requires an intentional effort of the pilot to move the linkages and maintain them moved from this initial positioning of the parts. Throughout all of the controls and under all conditions of flight of the helicopter, this stabilizing influence is automatically and continuously maintained.

When the helicopter tilts in any direction, due to any causes, the articulated suspension with the lifting unit on top of it will also tilt by a certain angle into its new position of balance, and there is always such position of stable balance corresponding to the angle of tilt of the body of the helicopter. This will produce a restoring moment in relation to the center of gravity of the system, and the helicopter is thus bound to restore to its normal orientation.

Illustrating this stability in connection with the parallel linkage suspension of the articulated polygonal system and referring to the diagrammatic showing in Fig. 10, the fuselage 31 of the helicoptor is provided with landing gear 32, tail skid 33 and the elevator compensator 34. A nose gear 35 may be positioned in front and at the top is a rigid frame 36 to serve as a support for the upper linked parts when the engine is not running. The lifting unit with base at ST comprises the engine 37 and airscrews 38 rotating oppositely with equal and opposite torques. The resultant torque, if any, produced by coaxial lifting propellers, or by a single propeller, is compensated by any suitable mechanism providing anti-torque moment, as springs, elastic cords or mechanical arrangements.

When the engine 37 is not running, the parallel suspension will naturally slip forward, backward or sidewise until it will rest upon the frame 36; when the engine is running, and as soon as the airscrews thrust Q will exceed the weight of the engine-airscrews set, it will lift the engine-airscrews set in the position indicated on Fig. 10. The engine-airscrews set will float stably in such position even before the thrust Q will lift the whole helicopter off the ground. Due to the substantial weight of the engine-airscrews set, it is advisable to equip the parallel suspension with either hydraulic or spring, or any elastic material dampers to dampen the oscillations. Any kind of hydraulic damping can be used for this purpose. For example, hydraulic dampers attached diagonally to the parallel suspension can be used, one 40 in the two side bays, one orientated along one diagonal in one side bay, the other 41 orientated along the other diagonal in the other side bay (Fig. 11) and two orientated along the two diagonals in the rear bay, leaving the front bay open for better visibility of the pilot.

It is important to notice that the parallel suspension remains fully stable for any inclined position of the helicopter, and to any such position corresponds a fully stable position of equilibrium of the parallel suspension.

The restoring moment value may be derived from consideration of the diagram for parallel suspension (Figs. 17 and 17a). Considering the oscillation of the parallel suspension in the longitudinal and lateral senses, from Fig. 17 one will easily see that the restoring moment $m$ in relation to the articulations $B_1$ and $B_2$ for the parallel suspension, when its base is horizontal, are equal to:

$$m = \frac{Q - p_1}{2} l \sin a$$

where $Q$ = the airscrew thrust,
$p_1$ = the weight of the airscrews-engine set (lifting system)
$l$ = the height of the parallel suspension (when it is in vertical position)
$a$ = the angle of deviation from vertical whereas for the pendulum of Fig. 17a, with the same notation we will have:

$$m = p_1 \sin a$$

We thus see that the excess thrust $$\frac{Q - p_1}{2}$$

as applied to the articulations $B_1$ and $B_2$ acts, for the parallel suspension, exactly as the weight of an oscillating pendulum, making the system stable.

The stability of the whole machine in flight is insured as follows: Suppose the helicopter in flight tilted forward. Then the weight $p_1$ of the engine-airscrews set, which is always vertical, together with the airscrews thrust Q, which is always perpendicular to ST (see Figs. 8a, 10 and 17), will give rise to a resultant directed forward and which will slightly shift the lifting unit of the machine in relation to the lower part 31 (the fuselage with pilot and landing gear). This will immediately produce a restoring moment in relation to the general center of gravity (due to the forward displacement of Q) tending to bring the machine to its original normal orientation, as diagrammed for the converging suspension in Fig. 10b.

Inherent stability of a wide range is achieved by the proper design and the dimensions of the links of the suspension system for various selected ratios of the combinations of weights of the lifting and the lifted units from 2 to $1/100$ or less for the lifting relative to the lifted units.

This comprises variation of the angle of inclination of the fuselage up to 90° longitudinally and transversely securing stability for the range of structural angle (Figs. 1 and 5) varying from 90° to 20°, for horizontal or inclined flights or hovering.

The principal idea of the articulated polygonal stabilizing with the above mentioned wide range angles of inclinations and ratios of weights of lifting and lifted parts is to have a freedom of motion of the lifting part of the machine under the influence of the wind by providing restoring moments, but at the same time it is operated at the will of the pilot.

Concerning the forward motion of the helicopter, the same is achieved as follows:

It is advantageous to locate the center of gravity $g_2$ (Fig. 10) of the lower part of the machine slightly forward from the axis $O_1$, $O_2$ of the airscrews set and to balance the so obtained forward tilting moment of the thrust Q by an adequate moment of the air-pressure $r$ of the slip-stream (produced by the airscrews) upon the elevator compensator 34 which thus has to be set in a position, such as $C_1$, $C_2$ (see Fig. 10) for normal hovering of the helicopter. Now when starting from such hovering conditions, if the air-pressure upon the compensator is decreased by a proper operation of same, the thrust Q will tilt the machine forward and the horizontal component of Q will produce the forward motion of the helicopter. As the helicopter speeds up the compensator has to be inclined forward more and more so that the resulting relative wind from the forward motion of the helicopter and the airscrews slip-stream gives rise upon the compensator 34 of an air-pressure just sufficient to maintain the helicopter in a slightly tilted forward orientation (Fig. 14). It is sufficient to maintain the lifting screws tilted only slightly to obtain from them the best forward propelling component.

Thus a compensator such as 34 disposed in the slip-stream of the airscrews is sufficient, in conjunction with the articulated polygonal suspension, to insure the forward motion of a helicopter.

By compensator is designated that special type of elevator disposed in the slip-stream of the airscrews of a helicopter and which is disposed in a substantially vertical orientation when the helicopter is hovering and progressively flattened out as the helicopter speeds forward.

The basic arrangement of the rudder or elevator or compensator insuring the longitudinal control of helicopters is as follows: In view of the fact that a horizontal rudder located in slipstream would produce a loss of lift a vertical rudder, perpendicular to the plane of symmetry of the helicopter is used by swinging such rudder forward or backwards from its central position $r_v$ (Fig. 14), one will obtain the longitudinal control of the helicopter when hovering or climbing.

Now, if the helicopter begins to move forward, the vertical slip-stream produced by the lifting propellers is combined with the air velocity due to the forward motion and the compensator finds itself in an air-stream, which starting by being vertical, progressively makes smaller and smaller angles with the horizon, as the forward speed increases (see Fig. 14) where $Ov_1$, $Ov_2$, $Ov_3$, etc. represent the resultant relative air-velocities and $r_1$, $r_2$, $r_3$, etc. the successive positions which should be given the compensator (originally in position $r_v$), in order to maintain its effectiveness without unnecessary drag; these successive positions of the compensator have been represented side by side for clearness, when as a matter of fact they are superimposed.

Thus the compensator located in the slip-stream begins its orientation from vertical to substantially horizontal position as the helicopter speeds up. The compensator in a helicopter should thus be so mounted, that the pilot may operate it within an angle about 90° starting from vertical position up to close to horizontal position with the increase of the forward speed. This compensator operated by the pilot permits the longitudinal control of a helicopter for the whole range of its different states of motion, beginning from its vertical ascent to its horizontal flying speed.

A further improvement of the compensator is made of an arm or frame F (Fig. 14a), able to oscillate freely (floating compensator) around an axis A and to which two rudder surfaces are attached. One $r_a$ is rigidly attached to the frame F and freely oscillates with frame F around axis A. This surface $r_a$ will keep the frame F in the direction of the relative wind, resulting from slip-stream and forward motion. A second rudder surface $r_b$ is of such profile and setting that its resultant air resistance R (Fig. 14a) always passes through the axis A and is operated by any such mechanism that the pilot may give to it different orientation in relation to the floating frame F, without affecting the orientation of the frame F, kept in the relative wind by $r_a$.

The general result of such arrangement is that the pilot will be able to produce an air-force R of variable magnitude passing through the axis A and thus not affecting the orientation of the floating frame F. This force R permits the longitudinal control of the helicopter to tilt it forward and backwards. Such elevator, as above described, is called a floating compensator or elevator.

A tilting mechanism for inclining the lifting unit relative to the line ST may also be used. This tilting means (Figs. 13 and 13a) may be operated from the pilot's seat by any suitable mechanism, comprising for instance, a screw device 45 (Fig. 13a) pivoted at 46 and threaded into a rotatable nut 47 in pivoted bracket 48, the nut 47 being turned by the pilot through an intermediate universal connection 47a to adjust the length of the screw 45 and correspondingly tilt the frame 48a pivoted at 49 to the lifting unit base 50. The use of such tilting mechanism on top of the articulated polygon suspension, has the advantage of obtaining forward motion with an invariable orientation of the fuselage under all flying conditions. When the thrust Q is tilted, in relation to the upper part ST of the suspension, a horizontal component of Q is, of course, obtained, and the tilting moment produced by such displacement of the thrust Q can easily be balanced by a proper setting of the compensator 34 (see Fig. 10) operated by the pilot.

When the tilting arrangement for the thrust Q is not used, then in normal hovering conditions the fuselage may be set so as to have its nose directed somewhat upwards, which will not constitute any special inconvenience either for the occupant of same or for the hovering, so that the tilting required for forward motion would bring the fuselage into a horizontal orientation of minimum drag.

Although the variety of four combinations of attachment (1) parallel, (2) converging, (3) diverging and (4) parallel-converging-diverging combined (three universal joints and one sliding contact) (Figs. 7, 8, 8a; Figs. 1, 2, 2a, 3, 4, 4a; Figs. 5, 6, 6a and Fig. 2b) in six kinds of motion (1) vertical ascent, (2) descent, (3) gliding, (4) climbing, (5) horizontal flight and (6) hovering, are particularly different, the main principles of stabilization are explained only for parallel and converging types of suspension, with understanding that the other arrangements of stabilization do not deviate from the described attachments essentionally; they are only variants of the main prinicple of stabilization in combination with varying stabilizing moments and propulsive components.

Turns of the flying machine are accomplished by means of:

(a) Differential control of the pitch of blades,
(b) By vertical rudder, and
(c) By side flaps: longitudinal, vertical, located in the slip-stream produced by the lifting airscrews.

A variant of the combination of the shock absorption and engine axis centering applicable to the converging articulated polygonal linkage relative to the frame 55 is illustrated in Fig. 9a consisting of elastic cord coils 54 attached to the frame 55 rigidly attached to the fuselage. These coils 54 may be replaced by springs or hydraulic or pneumatic shock absorbing devices, or the like and may be mechanically adjusted by tension or compression or completely released. They maintain the top lifting unit 56 normally resiliently centered and connected by its links 57 to the fuselage. For relative adjustment of the lifting unit frame 56 it is connected by cross pieces 58 and rod 59 to a lever 60 universally pivoted at 61 to the cross bar 62 and universally connected at 63 to the lower end of the rod 59. The lowermost end of the lever 60 is universally connected at 64 to the pilot control rod 65.

As illustrated in Fig. 9b, the lifting unit 70 may be connected by ball joints 71 to the ends of the links 72 of a converging system. These ball joints comprise mating arcuate members 73, 74 held together by resilient clamping springs 75 permitting relative pivoted movement between the links 72 and the lifting unit 70. The ball joints 71 are preferably pivoted to the lifting unit 70 by pivots 76 and the control by the pilot may be applied by a connection at 77 intermediate the ends of the rods 78 pivoted to the links 72 as shown. Where the relative movement of the lifting unit is longitudinal and transverse, the various pivot connections will be universal joints and the ball joints will be spherical in shape. This system of Fig. 9b may be triangular formation in plan as indicated by the diagram of Fig. 9c where the frame 70a is connected by universal joints 79 to links universally pivoted at their lower ends to the fuselage. Similarly in Fig. 9d the lifting plate 70b is connected by universals 80 to the apex link 81 and the T-link structure 82, these link members being universally joined to the fuselage at their lower ends. As illustrated in Fig. 9e, the ball joints, for instance, of Fig. 9b, may have the surfaces of the cooperating members 83, 84 extending around over 180°, the outer member 83 being universally joined at 85 to the lifting base while the inner member 84 is carried by the link member 86. In Fig. 9f the lifting frame 90 is universally joined at 91 to an arcuate or spherical member 92 held slidingly within an arcuate bracket member 93 carried by the link 94 universally joined to the fuselage. Relative adjustment is made by linkages connecting the pilot stick to cross rod 95 universally joined at 96 to the links 94.

A typical control of the lifting unit frame by the pilot is shown in Fig. 18. The pilot stick 97 can be moved in any direction around the universal pivot 100—forward, backward or sidewise, the lower point 98 moving and describing a spherically shaped path around said center 100. Bar 101 is connected to the lower end of the pilot stick 97 at 98 and in turn at its other end connected at 102 to the link structure 103 pivoted at 104. At a fixed point of the fuselage the upper end of the link 103 is universally joined at 105 to the lower end of the lever 106 universally pivoted to the fuselage at 107, a sliding connection being interposed between the universals 105 and 107 on the lever 106, the upper end of which is universally and slidingly joined at 108 to the cross pieces 109 to the lifting unit frame 110. Movement imparted to the pilot's control stick 97 will be transmitted to the lifting unit frame in the converging articulated polygonal linkage system shown so that the lifting unit 110 may be inclined forward or backward or to either side, left or right, inclining the line of lift in any desired direction.

In Figs. 15 and 16 an inverted diverging suspension has the fuselage 115 rigidly attached to the base 116 connected by four universals 117 and diverging links 118 and universals 119 to the lifting unit 120 centered by a system of springs 121. The engine 122 is preferably mounted on unit 120 as shown with the propeller shafting 123 extending upward and carrying the airscrews 124 above the fuselage. The shafting 123 is maintained at a given angle relative to the unit so that as the unit 120 is shifted the shafting will be correspondingly tipped. For instance, as indicated in Figs. 15 and 16 with the center of gravity at $g_1$ (Fig. 15) in vertical line with the upward thrust, anything (as a gust of wind) tipping the helicopter fuselage 115 clockwise will tend to relatively tip the unit 120 and shafting 123 counterclockwise and shift the line of thrust to the right (Fig. 16) so that it will exert a counter-clockwise restoring moment around the center of gravity at its new position $g_2$.

What is claimed is:

1. A helicopter comprising two freely movable units, a lower unit constituting the body of the helicopter and an upper unit carrying the engine-propeller set and connected to the lower unit by a plurality of at least three pivoted links to have a position of equilibrium for every inclined orientation of the helicopter so as to produce a restoring moment in relation to the center of gravity so long as the helicopter is inclined from its normal flying orientation.

2. In a helicopter the combination of a lifting unit provided with propeller blades applying an upward thrust to said unit with a separate lifted unit, connecting means forming a suspension between said units and comprising a plurality of pairs of links pivoted at their upper ends to said lifting unit and at their lower ends to said lifted unit, a pilot stick in said lifted unit and control means connected thereto adapted to relatively shift the pivoted parts to give a desired relative inclination of the lifting unit.

3. A helicopter as set forth in claim 2 in which the plurality of links form with said units a plurality of polygons between said units.

4. A helicopter as set forth in claim 2 in which there are three or more connecting links having their pivoted ends at the corners of a plurality of polygons between said units.

5. A helicopter as set forth in claim 2 in which there are means holding the propeller to a set axis always applying the lifting effort at a predetermined fixed angle to a line connecting the upper ends of the connecting means at the lifting unit.

6. A helicopter as set forth in claim 2 in which there are means holding the propeller to a set axis at a right angle to the plane of the upper ends of the suspending links and always applying the lifting effort at a right angle to a line connecting the upper ends of the connecting means at the lifting unit.

7. A helicopter as set forth in claim 2 in which there is a compensator comprising an elevator located in the slip stream to regulate the tipping of the helicopter in forward motion and in hovering.

8. A helicopter as set forth in claim 2 in which there is a tilting mechanism for inclining the thrust line of the lifting force relative to the base line of the lifting unit.

9. A helicopter as set forth in claim 2 in which the points of connection of some of the links with one of said units are adjustable to vary the angles of the corresponding links with relation to the remaining links.

10. A helicopter as set forth in claim 2 in which the suspending links are provided with damping means permitting freedom of motion between the parts and flexibility of joints within predetermined limits of motion.

11. A helicopter as set forth in claim 2 in which the suspending linkage system is connected to the lifting and lifted units at points peripherally spaced around the vertical center line of the lifting unit so that the line of thrust of the lifting force oscillates inside of the lateral polygon formed by the linkages.

12. In a helicopter the combination with a lifting unit provided with a pair of oppositely rotating propellers applying an upward thrust to said unit in excess of the weight thereof, of a separate lifted unit including a support for the load to be carried, connecting means forming a suspension between said units and comprising a front pair of links and a rear pair of links each link being of the same length and pivoted at its upper end to said lifting unit and at its lower end to said lifted unit, a pilot stick in said lifted unit, and control means connecting said stick to said lifting unit and adapted to controllably tilt said unit in fore and aft direction.

13. Control means for helicopters, comprising, in combination with a fuselage, a propeller-engine unit therefor, a pylon structure including a head and a plurality of legs, said legs being mounted for turning movement relative to the fuselage and the head on parallel axes which are transverse to the longitudinal axis of the fuselage whereby the pylon structure is yieldable in fore and aft direction, means mounting said unit from the head, and means for causing said pylon structure to yield by a predetermined degree whereby to controllably tilt said unit in fore and aft direction.

14. Control means for helicopters comprising, in combination with a fuselage, a propeller-engine unit therefor, a pylon structure including a head and a plurality of legs, said legs being mounted for turning movement relative to the fuselage and the head on parallel axes which are transverse to the longitudinal axis of the fuselage whereby the pylon structure is yieldable in fore and aft direction, means mounting said unit from the head, and means restraining free yielding of the pylon and being operative to effect a controlled yielding of the pylon whereby to tilt the unit in fore and aft direction by a predetermined degree.

15. Control means for helicopters comprising, in combination with an engine-propeller unit, yieldable means mounted on said unit and suspending a horizontally disposed fuselage therefrom, the center of gravity of said unit lying below the center of thrust of said unit, and means varying the shape of said yieldable means so as to effect tilting of the thrust line of said unit simultaneously with travel of said center of gravity and said center of thrust oppositely to the direction of said tilting and by different degree, whereby said fuselage is maintained in its initial horizontal position.

16. A heavier than air flying machine consisting of two units, a lifting unit including a propeller, a lifted unit, and a plurality of at least three links pivotally connecting said units at each end and forming an articulated polygonal suspension for the lifted unit both laterally and longitudinally insuring inherent stability of the machine in all directions by producing a restoring moment toward normal orientation so long as the machine deviates therefrom, said links converging together from one unit toward the other.

17. A heavier than air flying machine consisting of two units, a lifting unit including a propeller, a lifted unit, and a plurality of at least three links pivotally connecting said units at each end and forming an articulated polygonal suspension for the lifted unit both laterally and longitudinally insuring inherent stability of the machine in all directions by producing a restoring moment toward normal orientation so long as the machine deviates therefrom, said links being pivotally connected to the units by universal joints.

WATSON WASHBURN,
Co-executor of the Estate of George de Bothezat, Deceased.

JULIA R. DE BOTHEZAT,
Co-executrix of the Estate of George de Bothezat, Deceased.

REFERENCES CITED

The following references are of record in the file of this patent:

UNITED STATES PATENTS

| Number | Name | Date |
|---|---|---|
| 897,738 | Gordon | Sept. 1, 1908 |
| 2,037,745 | Vaughn | Apr. 21, 1936 |
| 2,156,334 | De Bothezat | May 2, 1939 |
| 2,418,407 | Hays | Apr. 1, 1947 |